United States Patent
Thakur (10) Patent No.: US 9,268,811 B1
(45) Date of Patent: Feb. 23, 2016

(54) REPLAY OF WRITES IN REPLICATION LOG

(75) Inventor: Satyendra Singh Thakur, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 363 days.

(21) Appl. No.: 12/911,023

(22) Filed: Oct. 25, 2010

(51) Int. Cl.
G06F 7/00 (2006.01)
G06F 17/30 (2006.01)

(52) U.S. Cl.
CPC ................. *G06F 17/30368* (2013.01)

(58) Field of Classification Search
CPC .................................... G06F 17/30368
See application file for complete search history.

(56) References Cited

U.S. PATENT DOCUMENTS

| | | | |
|---|---|---|---|
| 5,875,444 A | 2/1999 | Hughes | 707/1 |
| 6,044,367 A | 3/2000 | Wolff | 707/704 |
| 6,067,541 A | 5/2000 | Raju et al. | |
| 6,530,038 B1 | 3/2003 | Hughes et al. | 714/15 |
| 6,732,124 B1 * | 5/2004 | Koseki et al. | |
| 6,820,098 B1 * | 11/2004 | Ganesh et al. | |
| 8,090,691 B2 * | 1/2012 | Lynn | 707/648 |
| 2002/0152230 A1 | 10/2002 | Gusler et al. | |
| 2003/0217043 A1 * | 11/2003 | Weiss et al. | 707/2 |
| 2006/0020634 A1 * | 1/2006 | Huras et al. | 707/200 |
| 2008/0114815 A1 * | 5/2008 | Sutoh et al. | 707/200 |
| 2009/0112947 A1 * | 4/2009 | Bourbonnais et al. | 707/204 |
| 2009/0216798 A1 * | 8/2009 | Wahlert et al. | 707/103 R |
| 2012/0203805 A1 * | 8/2012 | Lee et al. | 707/822 |

* cited by examiner

*Primary Examiner* — Ajith Jacob
(74) *Attorney, Agent, or Firm* — Campbell Stephenson LLP (57) ABSTRACT

A system and method for replaying writes in a replication log is provided. The replay of writes in the replication log can begin at some point after detecting an imminent overflow condition is detected. One method involves detecting the imminent overflow condition, performing a first synchronization for regions of the first volume based upon information in a first subset of the replication log, processing information in a second subset of the replication log while the first synchronization is ongoing, and performing a second synchronization for regions of the first volume based upon information in the second subset of the replication log, subsequent to the first synchronization and subsequent to processing the information in the second subset of the replication log.

20 Claims, 9 Drawing Sheets

FIG. 1

FIG. 2C – Processing Writes 3 & 4 During Replay

FIG. 2D – Start Replay of Writes 3 & 4

*FIG. 2E – Processing Writes 5 & 6 During Replay*

*FIG. 2F – Start Replay of Writes 5 & 6*

REPLAY OF WRITES IN REPLICATION LOG

BACKGROUND OF THE INVENTION

1. Field of the Invention

This invention relates to replaying writes, and more particularly, to replaying writes in a replication log.

2. Description of the Related Art

A replication system typically sends application writes performed on a primary volume to a secondary volume for replication. This replication is performed in order to maintain a consistent copy of application data at the secondary volume.

Some types of replication involve application writes being queued in a replication log before an application write is sent to the secondary volume for replication. Problems may arise when the number of application writes queued in a replication log increases to an amount close to or beyond the capacity of a replication log. When this occurs, the application data within the secondary volume may become unsynchronized with the primary volume. A replay of the application writes within the replication log is then performed to resynchronize the application data between the primary and secondary volume. During a replay, the regions of the application data that differ between a primary volume and secondary volume are identified and resynchronized.

Typically, this replay process is lengthy and may consume large amounts of computing resources. In addition, the replay process may also delay the completion of subsequent application writes to a primary volume.

SUMMARY OF THE INVENTION

Various systems and methods for replaying application writes in a replication log are disclosed. For example, one method involves detecting an imminent overflow condition associated with a replication log that identifies a plurality of write operations to be replicated from a first volume to a second volume. Subsequent to detecting the imminent overflow condition, the method involves synchronizing one or more first regions of the first volume with corresponding one or more first regions of the second volume based upon information in a first subset of the replication log. While the synchronizing is being performed, the method involves processing a second subset of the replication log by identifying one or more second regions of a first volume that were modified by one or more of the write operations identified in the second portion of the replication log and storing a result of the identifying. Subsequent to the synchronizing and the processing, the method involves synchronizing the one or more second regions of the first volume with corresponding one or more second regions of the second volume based upon the result of the identifying.

The method can also involve receiving a command to begin synchronization of the replication log after the imminent overflow condition is detected and synchronizing the one or more first regions of the first volume with the corresponding one or more first regions of the second volume is performed in response to receiving the command to begin synchronization of the replication log.

In one embodiment, the processing can include storing information identifying one or more of the second regions in response to detecting information identifying a write operation targeting the one of the second regions in the second portion of the replication log. The information stored can include a generated bit value to indicate a need for synchronizing the one of the second regions of the first volume with a corresponding one of the second regions of the second volume.

In another embodiment, the method can also involve determining if the identified write operation targeting the one of the second regions has already been processed. If the identified write operation has not been processed, then information identifying the one of the second regions is stored. If the identified write operation has already been processed, the information identifying the one of the second regions is not stored.

In yet another embodiment, the method can involve tracking regions of the first volume that have already been synchronized with regions of the second volume.

In another embodiment, the one or more first regions are identified as regions in the first volume that are targeted by write operations in the first portion of the replication log.

In yet another embodiment, the first and second subsets of the replication log include the entire contents of the replication log and the replication log is used to maintain write order fidelity between the first and second volumes, subsequent to the synchronizing the one or more second regions of the first volume with the corresponding one or more second regions of the second volume.

An example of a system can include one or more processors and memory coupled to the processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIGS. 2A through 2F, collectively referred to as FIG. 2, illustrate a replication log and bitmaps used for replaying writes in the replication log, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 1:
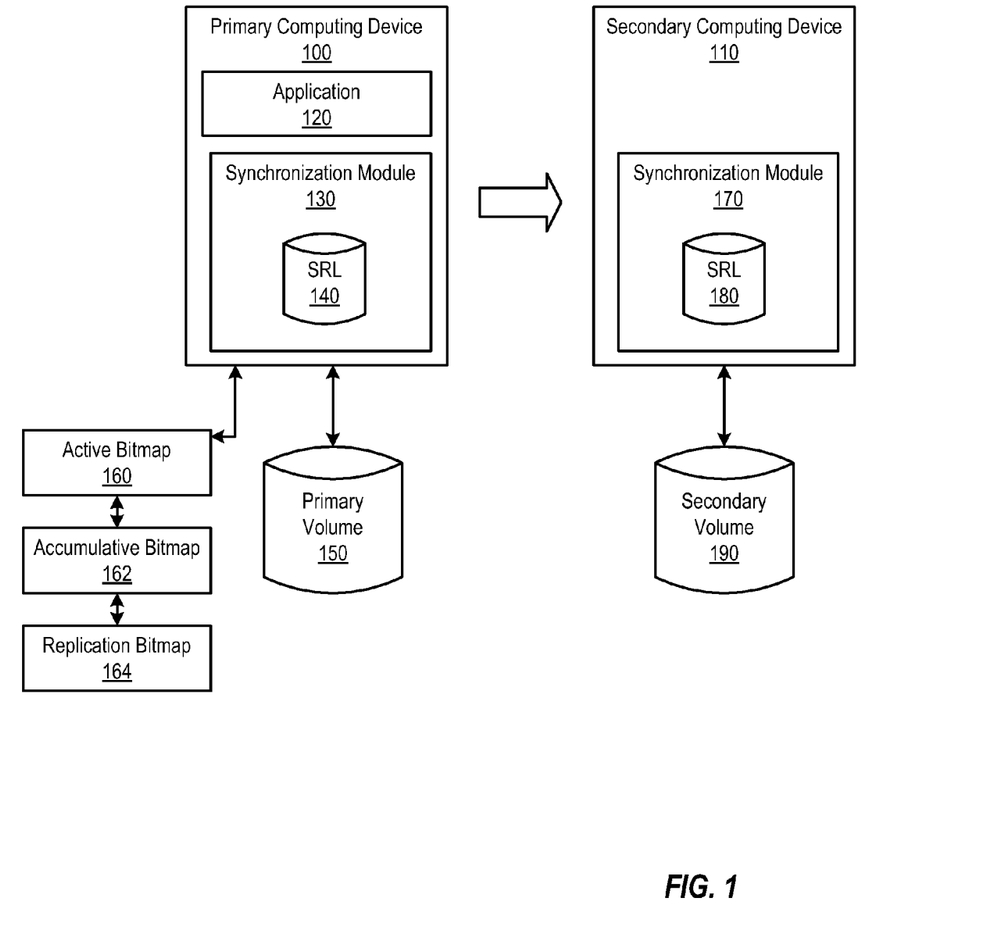
FIG. 1 is a block diagram showing relevant components of a system for replaying writes in a replication log, according to one embodiment of the present invention.

FIG. 1 is a block diagram showing relevant components of a system for replaying write operations in a replication log. As shown, the system includes a primary computing device 100 and a secondary computing device 110. Although not shown, the system of FIG. 1 may also include additional secondary computing devices.

Primary computing device 100 includes application 120. Although not shown, primary computing device 100 may also include additional applications. For simplicity purposes, primary computing device 100 is shown as having one application 120. Application 120 typically runs on primary computing device 100 and produces application write operations to be applied to application data.

Primary computing device also includes a synchronization module 130, which further includes a storage replication log (SRL) 140. SRL 140 is typically a circular buffer for storing the application write operations produced by application 120. Synchronization module 130 is used to replicate data from a primary volume to a secondary volume. When an application write, produced by application 120, is received by synchronization module 130, the application write is stored and queued in SRL 140. Thereafter, the application write is sent to the secondary volume for replication.

Primary computing device 100 is also coupled to a primary volume 150. SRL 140 is the replication log for primary volume 150. Typically, an SRL is included for each volume group coupled to a computing device. Although not shown, primary computing device 100 may be coupled to additional primary volume groups and synchronization module 130 may include additional SRLs for each additional primary volume group. For simplicity purposes, primary computing device 100 is shown as having one primary volume group that consists of one primary volume 150 and one corresponding SRL 140 within synchronization module 130.

In addition, primary computing device 100 is also coupled to a number of bitmaps used for synchronizing data between a primary volume and a secondary volume, which include active bitmap 160, accumulative bitmap 162, and replication bitmap 164.

Secondary computing device 110 includes a synchronization module 170. Synchronization module 170 includes an SRL 180 for each volume group coupled to the secondary computing device 110. Secondary computing device 110 is shown as being coupled to a secondary volume group consisting of one secondary volume 190.

Synchronization module 170 communicates with synchronization module 130 to replicate application writes and synchronize application data between primary volume 150 and secondary volume 190. Whenever an application write is produced by application 120, synchronization module 130 communicates the application write to synchronization module 170. Synchronization module 170 may then communicate the application write to SRL 180 and secondary volume 190 to synchronize the application data within secondary volume 190.

The system of FIG. 1 is used to replicate application writes from primary volume 150 to secondary volume 190. By replicating application writes to secondary volume 190, secondary volume 190 can be used to store and maintain a consistent copy of application data within secondary volume 190 that is accessible by secondary computing device 110. In the event of a failure within primary computing device 100 or primary volume 150, a copy of the application data within secondary volume 190 can be used to restart application 120 at secondary computing device 110.

In addition, although not shown, the system of FIG. 1 may also include multiple secondary computing devices to which the same application writes may be replicated to. In this case, any of the secondary computing devices may be used to restart application 120, in the event of a failure within primary computing device 100 or primary volume 150. For simplicity purposes, the system of FIG. 1 is shown as having only one secondary computing device 110.

Initially, application data within primary volume 150 is consistent with (i.e, an exact copy of) application data within secondary volume 190. As application 120 produces write operations, these write operations are applied to primary volume 150. In the meantime, these same application writes are intercepted and replicated to secondary volume 190 in the order in which the application writes are received at primary volume 150. The ordering of the application writes is preserved to maintain write-order fidelity. Once secondary volume 190 receives the application writes, the corresponding changes are applied to the application data within secondary volume 190. By doing so, application data within secondary volume 190 remains consistent with the application data within primary volume 150.

When application writes, to be applied to primary volume 150, are received by synchronization module 130, a copy of the application writes is stored within SRL 140. Sometimes, SRL 140 may experience an imminent overflow condition. An imminent overflow condition within SRL 140 may occur when the number of application writes stored within SRL 140 fills up to a point that is close to or beyond the capacity of SRL 140. This imminent overflow condition may due to a network outage, a slow network, or an unavailable secondary computing device.

Examples of circumstances that could cause SRL 140 to overflow or become close to overflow include a temporary burst of application writes from the application or a temporary congestion in the network coupling the primary and secondary computing devices, a temporary failure of the secondary computing device, a temporary failure of the network connection between the secondary computing device and the primary computing device, or the inability of network bandwidth to keep up with the rate of application writes at the primary computing device.

When an imminent overflow condition in SRL 140 occurs, new application writes on the primary computing device may not be able to be processed. In addition, the application data within secondary volume 190 may become inconsistent with the application data within primary volume 150. This is because SRL 140 may no longer be able to track the order of incoming application writes. Therefore, a replay of the application writes within SRL 140 should be performed to complete a resynchronization of application data with primary volume 150 and secondary volume 190. This resynchronization process is performed to ensure that application data within secondary volume 190 is once again consistent with application data within primary volume 150.

Typically, the replay of application writes in SRL 140 should not begin until each application write within SRL 140 is processed and the appropriate region targeted by each application write is designated for replay. Starting the replay of SRL 140 prior to completing the processing and designation of bits for each application write within SRL 140 can result in wasted network bandwidth and an overall increase in the amount of time needed to complete a replay of SRL 140. For example, starting the replay of SRL 140 early may result in the repeated replay of the same regions on a volume, whereas waiting to start the replay of SRL 140 until all application writes are processed and designated would avoid the repeated replay of the same regions on a volume and thus save on the overall time needed to complete the replay of SRL 140.

By using a series of bitmaps or other similar data structures (e.g., logs, lists, and the like), the replay of SRL 140 may start to perform some time after the imminent overflow condition has been detected. As shown, a series of three bitmaps may be used to perform the replay of SRL 140. These bitmaps include active bitmap 160, accumulative bitmap 162, and replication bitmap 164, which allow for the tracking of regions within the primary volume that have been targeted by write operations, the regions of the primary volume that have already been processed and/or replayed, and the regions of the primary volume that need to be replayed.

Active bitmap 150 may be used to track regions of the primary volume that are targeted by application writes. When application writes target particular regions of a primary volume, these regions of the primary volume have been changed and thus will need to be changed in (i.e., replayed to) the secondary volume to retain consistency of the application data within the secondary volume. Accumulative bitmap 152 may be used to track regions of the primary volume that have already been replayed or are in the process of being replayed. Finally, replication bitmap 154 may be used to designate the regions of the primary volume that are in need of synchronization during a replay.

When the imminent overflow condition is detected, synchronization module 130 may begin using active bitmap 160, accumulative bitmap 162, and replication bitmap 164 to facilitate the replay of SRL 140. Further details of how these bitmaps are used by synchronization module 130 is explained in FIG. 2, which illustrates an example method for replaying application writes in a replication log.

Figure 2A:
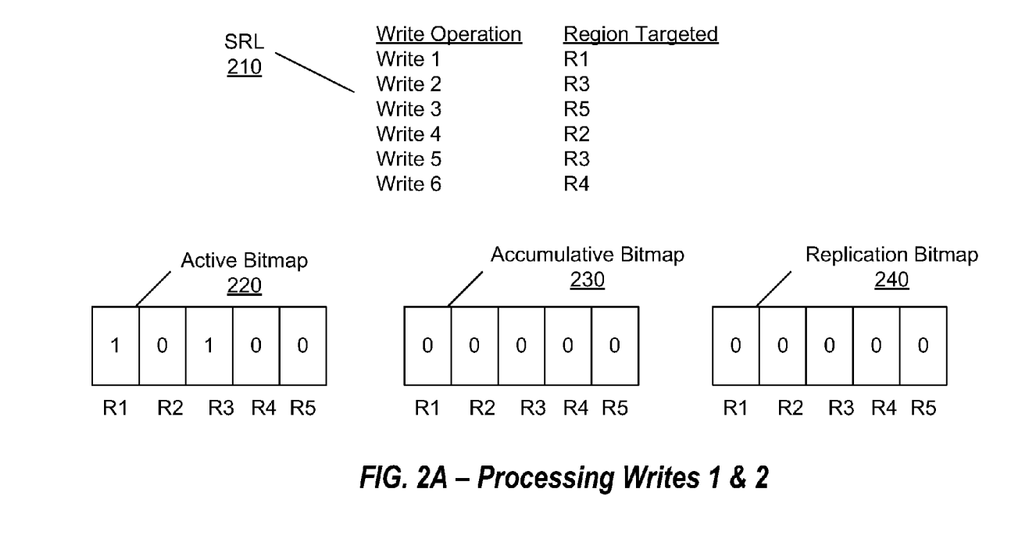
FIG. 2A shows the contents of the replication log and state of the bitmaps after processing a first set of application writes in the replication log, according to one embodiment of the present invention.

FIG. 2A shows the contents of a replication log and the state of three bitmaps after processing a first set of application writes in the replication log. The contents of a replication log after an imminent overflow condition has been detected can be seen in SRL 210. SRL 210 contains a number of write operations, where each write operation targets a region of a primary volume. For example, write operation 1 targets region 1 (R1), write operation 2 targets region 3 (R3), write operation 3 targets region 5 (R5), write operation 4 targets region 2 (R2), write operation 5 targets R3, and write operation 6 targets region 4 (R4). In other embodiments, a write operation may target more than one region of the primary volume.

Also shown are the three bitmaps used by the synchronization module for the instant replay of application writes in a replication log: active bitmap 220, accumulative bitmap 230, and replication bitmap 240. The functionality of these bitmaps can be provided by other types of data structures. For example, indications of regions targeted by write operations may be stored as a table or other data structure that tracks changes made to a given region of a storage area with reference to a corresponding region of another storage area.

When using bitmaps, the value of a bitmap can be used to indicate whether a region of a primary volume is synchronized with a corresponding region of a secondary volume. As shown, each of active bitmap 220, accumulative bitmap 230, and replication bitmap 240 contains bit values for five regions, R1, R2, R3, R4, and R5, that correspond to regions R1, R2, R3, R4, and R5 of the primary volume, respectively.

Prior to an imminent overflow condition occurring, all bit values for R1-R5 in active bitmap 220, accumulative bitmap 230, and replication bitmap 240 are set to zero to another default value (e.g., one). Thereafter, a bit value may be generated for each of R1-R5 to indicate whether a region of the primary volume is unsynchronized with a corresponding region of the secondary volume and whether a region of the primary volume has already been replayed to synchronize regions of the primary volume with regions of the secondary volume.

FIG. 2A illustrates the contents of active bitmap 220, accumulative bitmap 230, and replication bitmap 240 after processing a first set of application writes in the replication log, particularly write operations 1 and 2 from SRL 210. In this example, a command to begin replay of application writes in the replication log occurs after processing write operations 1 and 2 but before processing write operations 3, 4, 5, and 6.

Initially, regions of the primary volume targeted by write operations should result in a replay of such regions to the secondary volume. This is because the identified regions of the secondary volume are unsynchronized with corresponding regions of the primary volume, and such regions have not been previously resynchronized since the imminent overflow condition has been detected.

Regions of the secondary volume that should be replayed are tracked by bit values within active bitmap 220. These bit values are typically generated by a synchronization module within a primary computing device.

An example generated bit value is "1," which may be used to indicate a region of the primary volume that is unsynchronized with a corresponding region in the secondary volume. In this example, write operations 1 and 2 are shown to target R1 and R3, which results in a generated bit value of "1" for R1 and R3 in active bitmap 220 to indicate that these two regions of the primary volume are unsynchronized with the corresponding regions of the secondary volume.

Figure 2B:
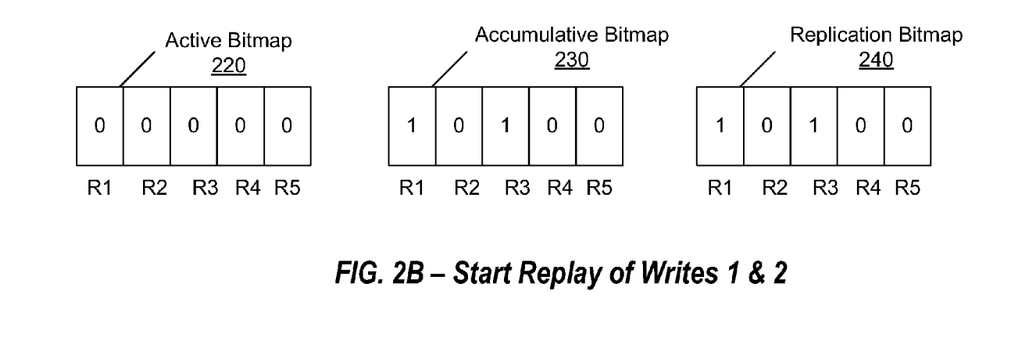
FIG. 2B shows the state of the bitmaps when the first set of application writes in the replication log has been replayed, according to one embodiment of the present invention.

FIG. 2B shows the state of the bitmaps when the first set of application writes in the replication log have been replayed. A replay of write operations in a replication log typically begins in response to receiving a command. A command can be received from a user, from software, or from either. Some examples of when a command may be received include receiving a command after a certain number or percentage of application writes in the replication log have been processed or after a certain amount of time has elapsed since the imminent overflow condition has been detected.

The command to begin the replay of write operations in a replication log can be received at any point after an imminent overflow condition occurs. In this example, the replay of write operations in the replication log begins after a first set of write operations have been processed (e.g, write operations 1 and 2) but before write operations 3, 4, 5, and 6 have been processed.

In order to start the replay process, active bitmap 220, accumulative bitmap 230, and replication bitmap 240 are updated accordingly by a synchronization module with the primary computing device.

First, the contents of the active bitmap 220 are copied to accumulative bitmap 230 and replication bitmap 240. By copying the contents of the active bitmap to the accumulative bitmap, accumulative bitmap 230 can be used to track the regions of the primary volume that have already been processed and are about to be synchronized during a replay. Thus, the synchronization module will generate and set the bit value of R1 and R3 within accumulative bitmap 230 to a "1" to indicate that write operations targeting R1 and R3 have already been processed and are about to be replayed.

By copying the contents of the active bitmap to the replication bitmap, the synchronization module can look to replication bitmap 240 to determine which regions of the primary volume need to be synchronized with corresponding regions of the secondary volume. For this reason, the synchronization module will generate and set bit values of "1" for R1 and R3 within replication bitmap 240 to indicate that these two regions of the primary volume need to be synchronized with R1 and R3 of the secondary volume during the current replay.

Once the accumulative bitmap and replication bitmap have been updated, the synchronization module will clear the contents of active bitmap 220 in preparation for further processing. The active bitmap can be cleared by setting all bit values for R1-R5 to "0."

Figure 2C:
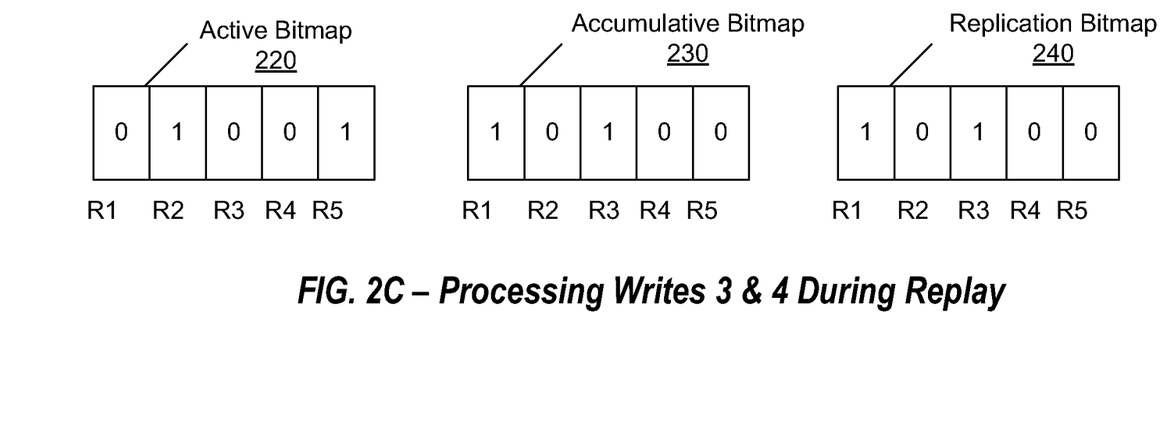
FIG. 2C shows the state of the bitmaps after processing a second set of application writes in the replication log, according to one embodiment of the present invention.

FIG. 2C shows the state of the bitmaps after processing a second set of application writes in the replication log. The second set of application writes will include write operations 3 and 4. In addition, the processing of the second set of application writes is performed during the replay of write operations 1 and 2.

The synchronization module within the primary computing device will update active bitmap 220 and accumulative bitmap 230 accordingly to process write operations 3 and 4. In order to process these write operations, a determination is made as to whether the region targeted by a write operation has already been processed and/or replayed, as reflected by the accumulative bitmap. In the event that the region targeted by a write operation has not been processed and/or replayed, the synchronization module will generate a corresponding bit value of "1" for that region within active bitmap 220. In the event that the region targeted by a write operations has already been processed and/or replayed, the corresponding bit value for that region within active bitmap 220 remains a "0."

Write operations 3 and 4 are shown to target R5 and R2, which have not been previously processed and/or replayed, as evidenced by a bit value of "0" within accumulative bitmap 230. Accordingly, a bit value for R5 and R2 may be generated and set to "1" within active bitmap 220 to indicate that R5 and R2 of the primary volume need to be synchronized with corresponding regions of the secondary volume.

Figure 2D:
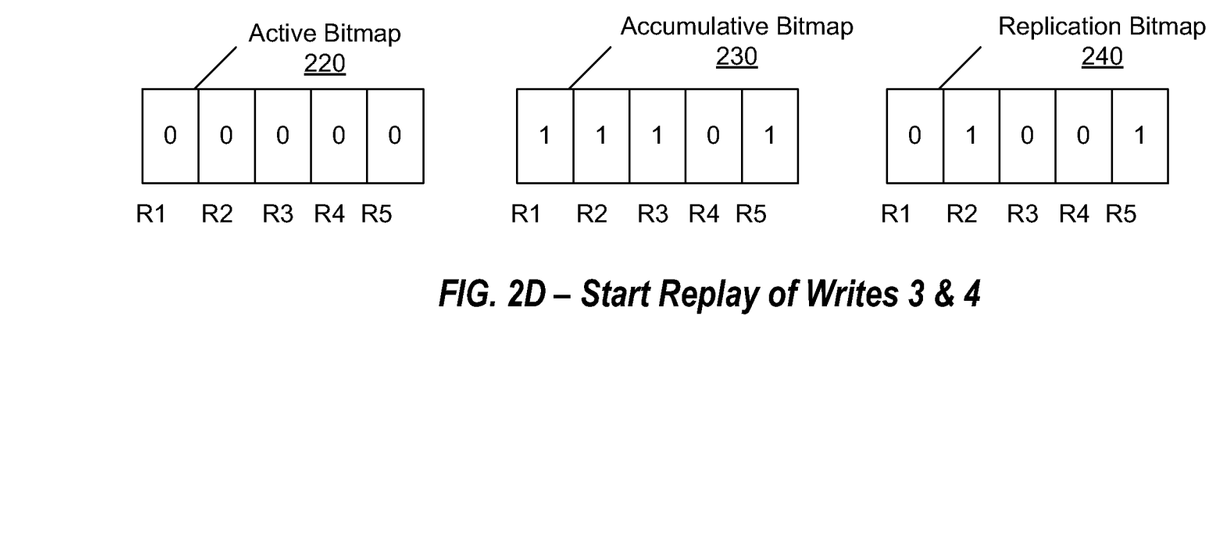
FIG. 2D shows the state of the bitmaps when the second set of application writes in the replication log is replayed, according to one embodiment of the present invention.

FIG. 2D shows the state of the bitmaps when the second set of application writes in the replication log is replayed. This second replay comprises a second subset of write operations in the replication log and begins upon completion of the replay of the first subset of write operations within the replication log. In addition, the replay of the second subset of write operations may also be started in response to other triggers.

At this point, write operations 3 and 4 have been processed but write operations 5 and 6 have not been processed. Thus, the replay of the second subset of write operations will include the replay of write operations 3 and 4.

Prior to starting the replay of the second subset of write operations, the synchronization module within the primary computing device will update active bitmap 220, accumulative bitmap 230, and replication bitmap 240 accordingly. First, accumulative bitmap 230 is updated to reflect regions of the first volume that have already been processed and are about to be replayed and/or regions of the first volume that have already been replayed.

During the replay of the first subset of write operations from the replication log, R1 and R3 were replayed and thus bit values for R1 and R3 within the accumulative bitmap continue to be set to "1" to indicate that these regions of the first volume have already been replayed. The replay of the second subset of writes will be replaying write operations 3 and 4, which will target R5 and R2. Accordingly, a bit value of "1" is generated for R5 and R2 in accumulative bitmap 230 to indicate that these regions of the first volume are about to be replayed. Thus, accumulative bitmap consists of a "1" bit value for R1, R2, R3, and R5 and a "0" bit value for R4, as shown. The resulting bit values for accumulative bitmap 230 can be obtained by combining the contents of accumulative bitmap 230 and active bitmap 240. An example of how these two bitmaps can be combined is by performing a bitwise OR operation of these two bitmaps.

Replication bitmap 240 is also updated prior to starting the replay of the second subset of write operations in the replication log. Replication bitmap 240 is updated by copying the contents of active bitmap 220, after processing write operations 3 and 4, to replication bitmap 240. Replication bitmap 240 thus consists of a generated bit value of "1" for R5 and R2. By doing so, replication bitmap 240 indicates the regions of the first volume that need to be synchronized with corresponding regions of the secondary volume during the replay of the second subset of writes from the replication log.

Active bitmap 220 is also updated by clearing the contents of active bitmap 220 in preparation for further processing. The active bitmap can be cleared by setting all bit values for R1-R5 to "0."

Figure 2E:
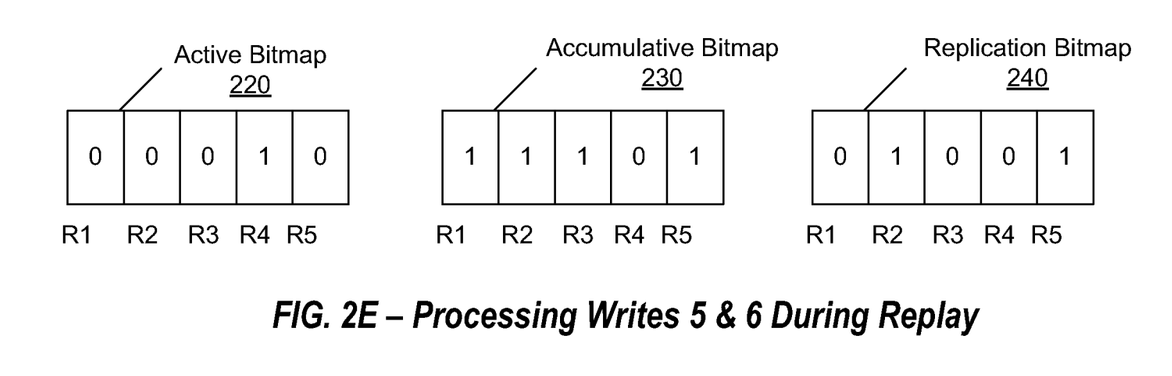
FIG. 2E shows the state of the bitmaps after processing a third set of application writes in the replication log, according to one embodiment of the present invention.

FIG. 2E shows the state of the bitmaps after processing a third set of application writes in a replication log, according to one embodiment of the present invention. The third set of application writes in the replication log includes write operations 5 and 6. These write operations are processed while the second replay is occurring.

To process write operations 5 and 6, active bitmap 220 and accumulative bitmap 230 are updated accordingly by the synchronization module within the primary computing device. In order to process these write operations, a determination is made as to whether the region targeted by a write operation has already been processed and/or replayed, as reflected in the accumulative bitmap. In the event that the region targeted by a write operation has not been processed and/or replayed, a corresponding bit value of "1" is generated for that region within active bitmap 220. In the event that the region targeted by a write operations has already been processed and/or replayed, the corresponding bit value for that region within active bitmap 220 remains a "0."

Write operations 5 and 6 are shown to target R3 and R4. By looking at accumulative bitmap 230, a determination can be made that R3 has already been replayed and that R4 has not been replayed or processed, as evidenced by a bit value of "1" for R3 and "0" for R4 in accumulative bitmap 230. Accordingly, a bit value for R4 may be generated and set to "1" within active bitmap 220 to indicate that R4 of the primary volume needs to be synchronized with R4 of the secondary volume.

Given that R3 was previously replayed, a bit value of "1" is not generated and set within active bitmap 220. This ensures that R3 is not resynchronized unnecessarily. Doing so can help conserve network bandwidth and increase the overall speed in which overlapping write operations are processed and replayed.

Once write operations 5 and 6 have been processed, all write operations within the replication log have been processed and a checkpoint may be marked within the replication log. This checkpoint is typically used to indicate the location within the replication log that includes the totality of write operations within the replication log when the imminent overflow condition was detected.

Figure 2F:
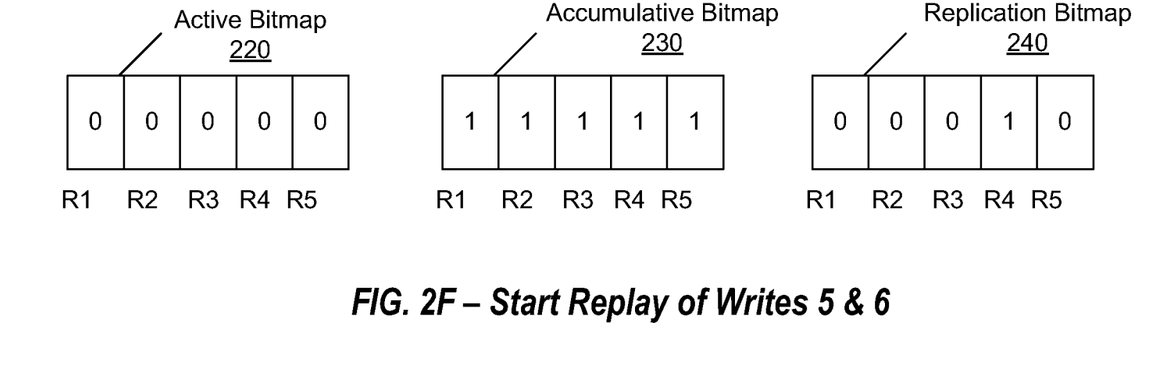
FIG. 2F shows the state of the bitmaps at the start of the replay of the third set of application writes in the replication log, according to one embodiment of the present invention.

FIG. 2F shows the state of the bitmaps at the start of the replay of the third set of application writes in the replication log. This replay of the third set of application writes in the replication log, once completed, completes an entire replay of the replication log, as the replication log existed when the imminent overflow condition was detected. The end of the replication log as it existed when the imminent overflow condition was detected is marked by a checkpoint.

Prior to starting the replay of the third set of application writes, each of active bitmap 220, accumulative bitmap 230, and replication bitmap 240 are updated accordingly by the synchronization module within the primary computing device.

Accumulative bitmap 230 is updated by combining the accumulative bitmap 230 and active bitmap 220 to indicate all regions of the first volume that have been processed and/or replayed. This combining may accomplished by performing a bitwise OR operation on accumulative bitmap 230 and active bitmap 220 to create an updated accumulative bitmap 230. Doing so results in accumulative bitmap 230 being updated to reflect that R1, R2, R3, and R5 have previously been replayed and R4 has been processed and is about to be replayed. Thus, accumulative bitmap 230 includes a bit value of "1" for each of R1-R5.

Replication bitmap 240 is updated by copying the contents of active bitmap 220 to replication bitmap 240. Replication bitmap 240 thus includes a bit value of "1" for R4 to indicate that R4 needs to be synchronized during the replay of the third set of write operations from the replication log.

Once the final replay of writes 5 and 6 has been completed, the entire replay of the replication log is complete, as indicated by a marked checkpoint. A checkpoint is typically marked by storing information about a begin position (i.e., the address of the replication log where a checkpoint begins) in the replication log header. This begin position is the address in the replication log that indicates where a replay will be stopped.

Thereafter, a replication link can be attached after the marked checkpoint and normal synchronization may then be resumed.

Figure 3:
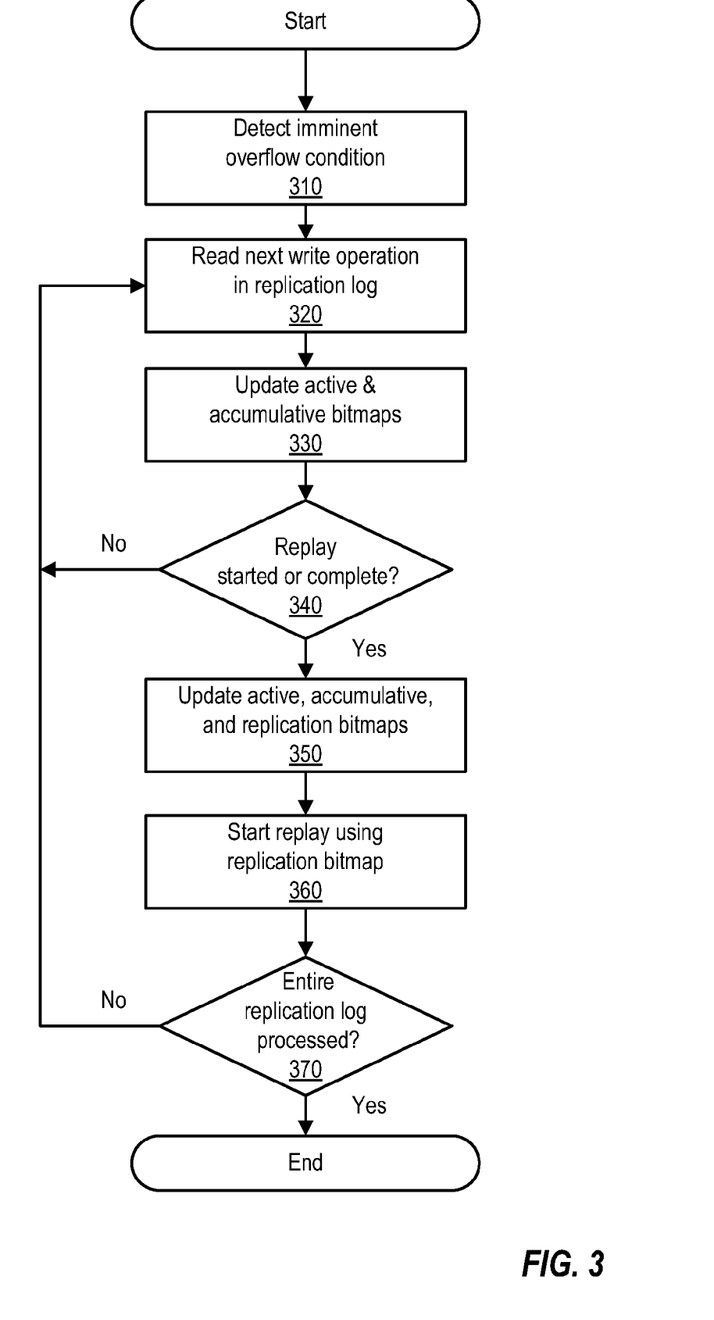
FIG. 3 is a flowchart illustrating relevant aspects of an example method for replaying writes in a replication log, according to one embodiment of the present invention.

FIG. 3 illustrates relevant aspects of an example method of replaying application writes in a replication log. The replay of application writes in a replication log is performed by a synchronization module within a primary computing device, (e.g., synchronization module 130 in FIG. 1).

The method of FIG. 3 allows for the replay of write operations in a replication log at some point after an imminent overflow condition has been detected but before each of the write operations in the replication log has been processed.

The method begins at 310 where an imminent overflow condition is detected. The method continues at 320 where a write operation from a replication log (i.e, SRL) is read. At this point, the write operation is identified and a determination of a region targeted by the identified write operation is made.

Figure 4:
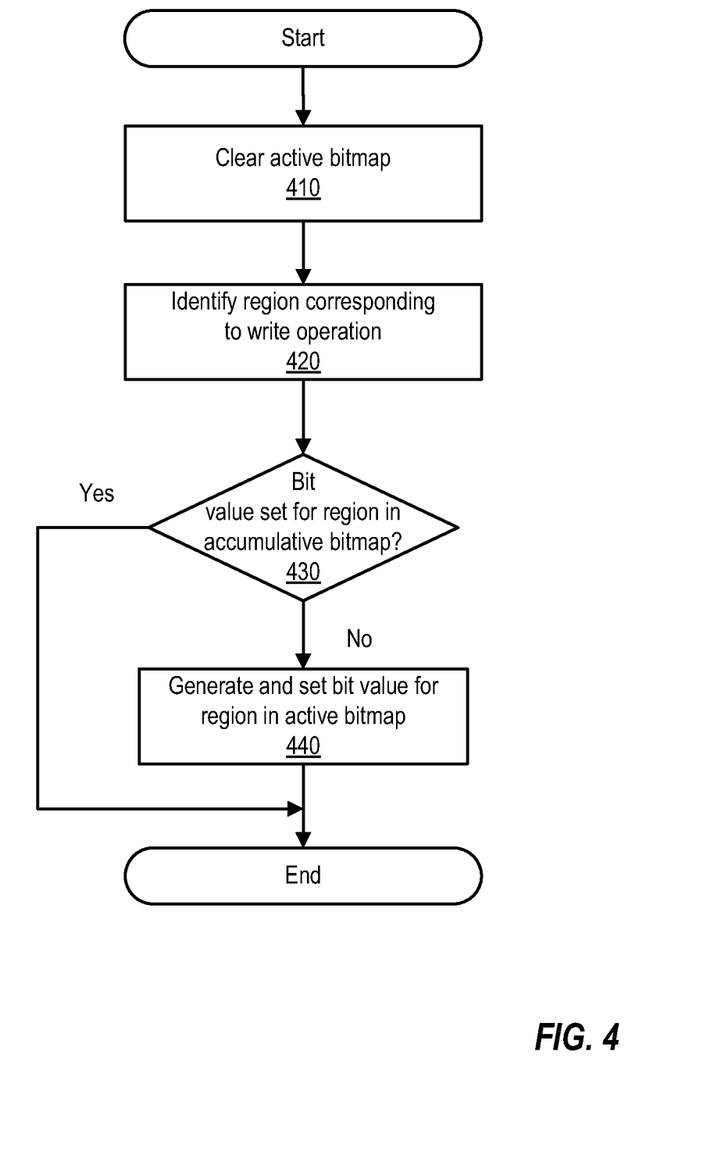
FIG. 4 is a flowchart illustrating relevant aspects of an example method for updating a type of bitmap used, according to one embodiment of the present invention.
Figure 5:
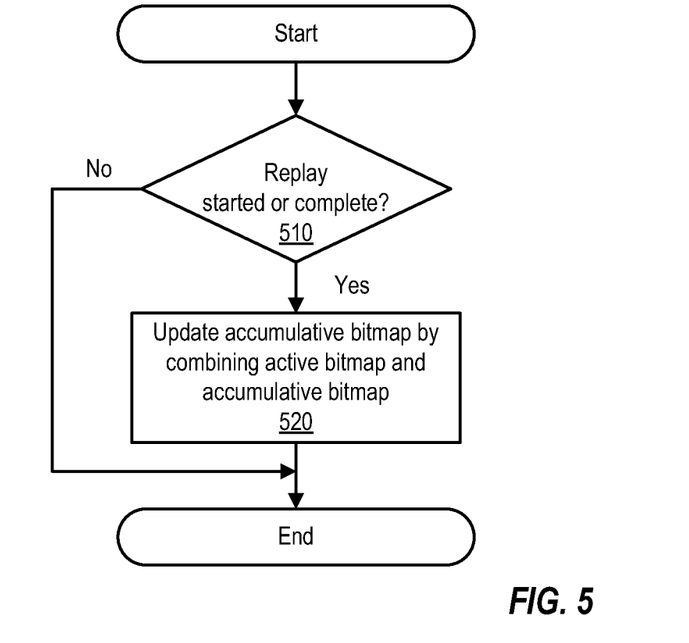
FIG. 5 is a flowchart illustrating relevant aspects of an example method for updating a type of bitmap used, according to one embodiment of the present invention.

At 330, the active bitmap and accumulative bitmap are updated to reflect the write operation read in 320. This updating process involves determining whether the region targeted by the write operation has already been processed and/or replayed and whether or not the region targeted by the write operation needs to be replayed. FIGS. 4 and 5 provide further details as to how the active bitmap and accumulative bitmap are updated.

At 340, a determination is made as to whether a replay has been started or has completed. Initially, the determination of 340 will determine whether a replay has started. A replay typically starts in response to receiving a command to start the replay some time after the imminent overflow condition has been detected. Thereafter, the determination of 340 will determine whether a previously started replay has completed.

Figure 6:
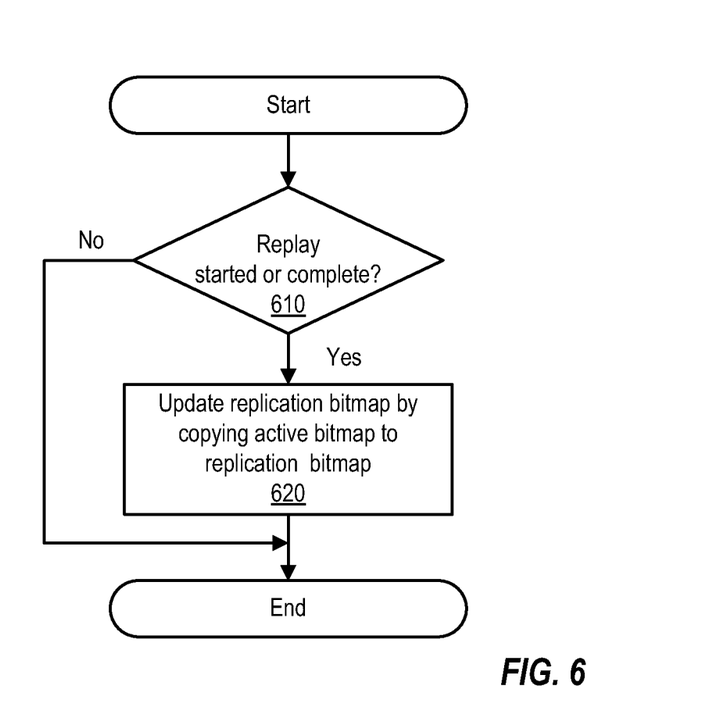
FIG. 6 is a flowchart illustrating relevant aspects of an example method for updating a type of bitmap, according to one embodiment of the present invention.

In the event that a replay has not started or completed, the method continues at 320, where the next write operation in the replication log is processed accordingly. In the event that a replay has been started or has completed, the active, accumulative, and replication bitmaps are updated accordingly. This update is performed to prepare for further processing of write operations, to update the bitmaps to reflect the regions of the first volume that have already been processed and/or replayed, and to update the bitmaps to reflect the regions of the first volume that need to be replayed. FIGS. 4-6 provide further details as to how each of these bitmaps is updated.

Once the bitmaps have been updated, a replay of the write operations that have been processed thus far can be started using the contents of the replication bitmap, as shown in 360.

While the replay is ongoing, a determination is made in 370 to determine whether the entire replication log has been processed. A replication log is processed in its entirety when each of the write operations in the replication log, which existed at the time the imminent overflow condition was detected, is read, processed, and replayed.

In the event that the entire replication log has not been processed, the method continues by reading the next write operation in the replication log, as shown in 320. In the event that the entire replication log has been processed, the method ends when the last replay is completed.

FIG. 4 illustrates relevant components of a method for updating an active bitmap, as performed by a synchronization module within a primary computing device (e.g., synchronization module 130 in FIG. 1). This methodology is performed each time a write operation from a replication log is read.

Once a write operation has been identified, the method begins at 410 where the active bitmap is cleared. At 420, the region of the first volume targeted by the write operation is identified.

At 430, a determination is made as to whether the region identified in 420 has a generated bit value in the accumulative bitmap. One example of the generated bit value may be a "1," although other values may also be used. If the bit value for the identified region in the accumulative bitmap is not set, a bit value is generated and set for the identified region within the active bitmap, as shown in 440. At this point, the process ends.

FIG. 5 illustrates relevant components of a method for updating an accumulative bitmap, as performed by a synchronization module within a primary computing device (e.g., synchronization module 130 in FIG. 1). The method begins at 510 where a determination is made as to whether a replay process has been started or completed.

If a replay has not been started or completed, the process ends. By contrast, if a replay has been started or completed, the accumulative bitmap is updated by combining the active bitmap and the accumulative bitmap, as shown in 520. Combining the active bitmap and the accumulative bitmap in 520 preserves the values already set in the accumulative bitmap and adds the values in the active bitmap. This combination of the active and accumulative bitmaps may also be accomplished by performing a bitwise OR operation of the active and accumulative bitmaps.

The combination of these two bitmaps produces an updated accumulative bitmap that reflects all regions of the first volume that have already been processed and/or replayed. At this point, the process ends.

FIG. 6 illustrates relevant components of a method for updating a replication bitmap, as performed by a synchronization module within a primary computing device (e.g., synchronization module 130 in FIG. 1). The method begins at 610 where a determination is made as to whether a replay has been started or completed.

If a replay has not been started or completed, the process ends. By contrast, if a replay has been started or completed, the replication bitmap is updated by copying the active bitmap to the replication bitmap, as shown in 620. Doing so may overwrite existing contents of the replication bitmap. At this point, the replication bitmap indicates which regions of the first volume are unsynchronized with corresponding regions of the secondary volume. The replication bitmap can then be used to perform subsequent replays. At this point, the process ends.

Figure 7:
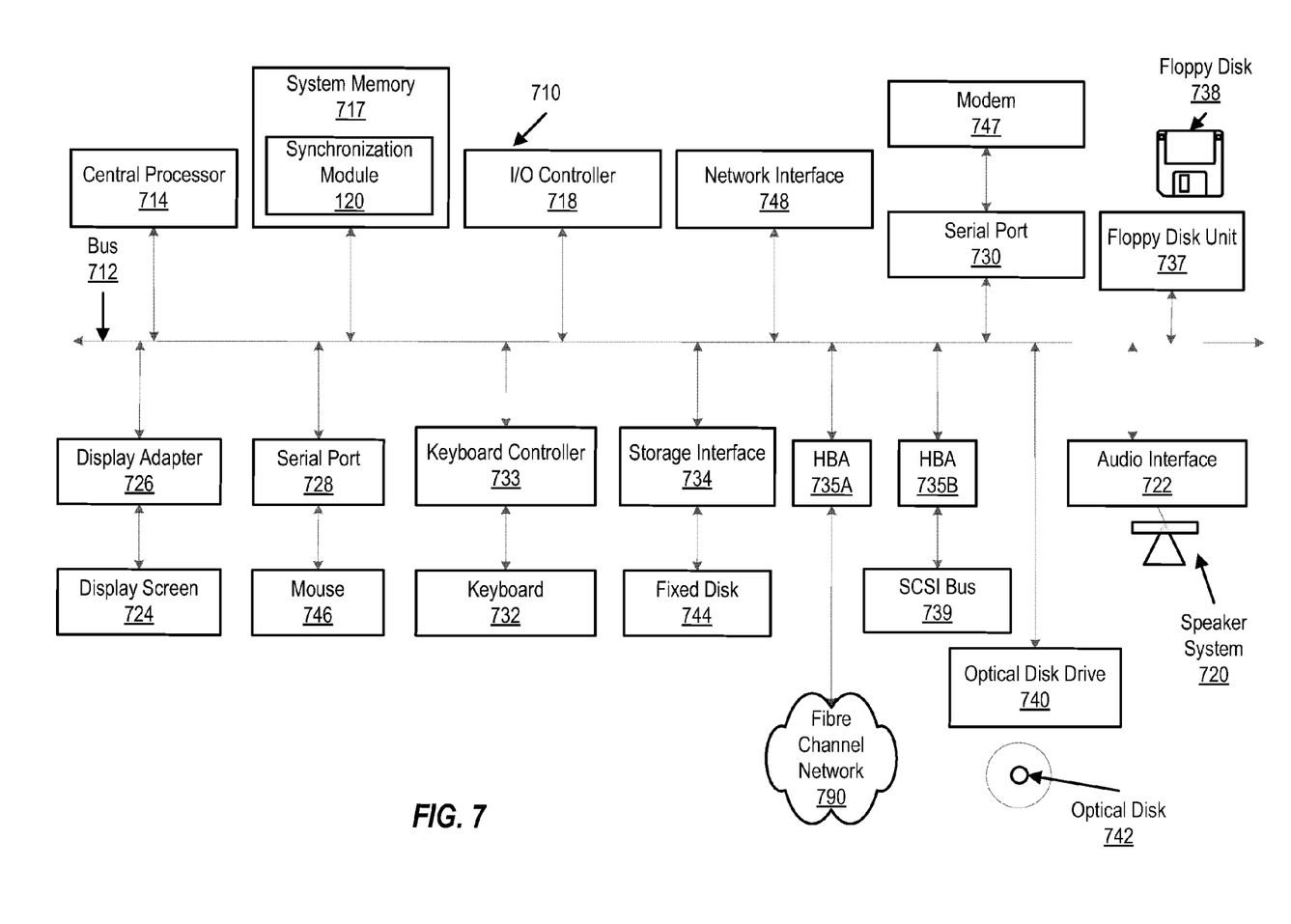
FIG. 7 is a block diagram of a computing system, according to one embodiment of the present invention.

FIG. 7 is a block diagram of a computing system 710 suitable for implementing the replay of a replication log as described above. Computer system 710 includes a bus 712 which interconnects major subsystems of computer system 710, such as a central processor 714, a system memory 717 (typically RAM, but which may also include ROM, flash RAM, or the like, and may also include the synchronization module 120), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 710 are generally stored on and accessed via a computer-readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 7 need not be present to practice the present invention. The devices and subsystems can be interconnected in different ways from that shown in FIG. 7. The operation of a computer system is readily known in the art and is not discussed in detail in this application. Code to implement the present invention can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
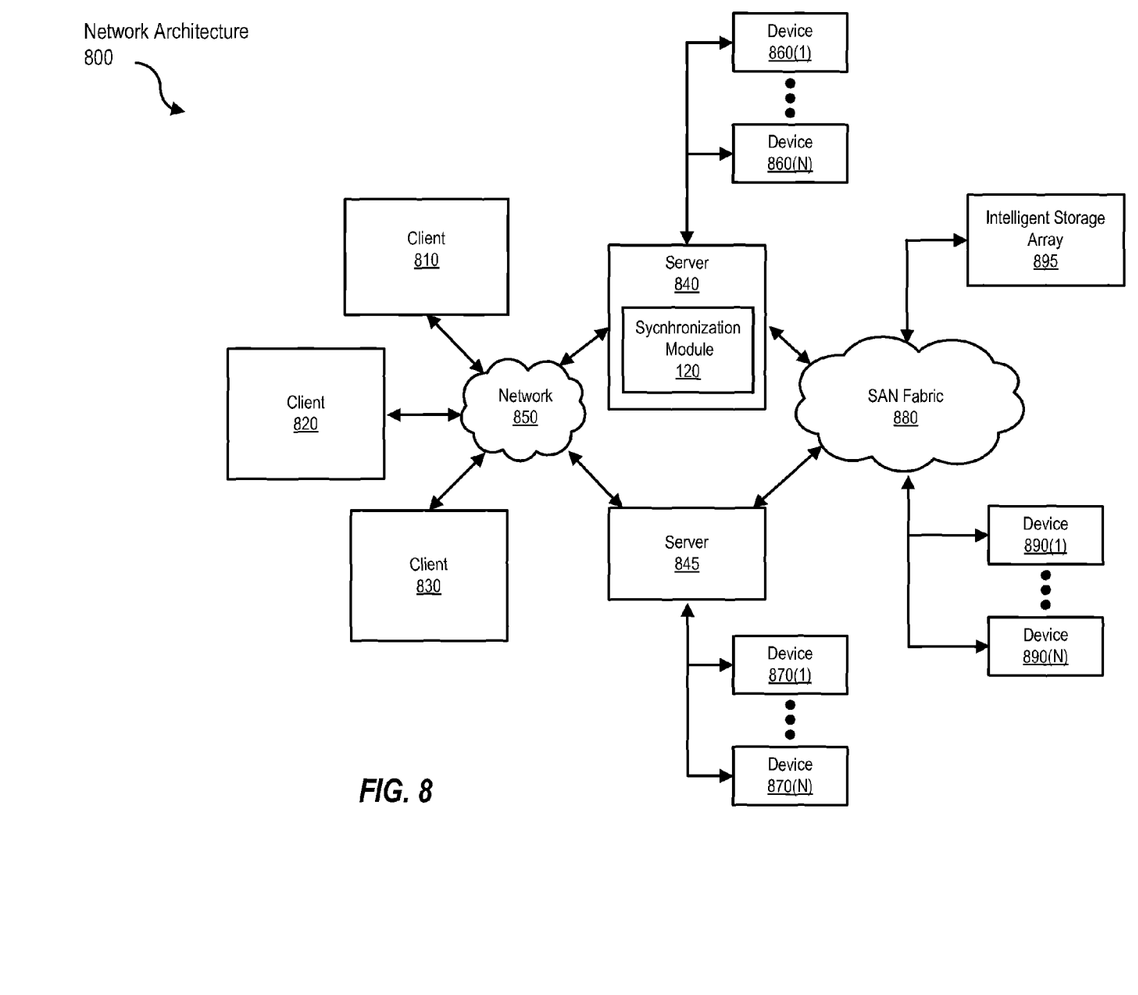
FIG. 8 is a block diagram of a network system, according to one embodiment of the present invention.

FIG. 8 is a block diagram of a network architecture 800 in which client systems 810, 820, and 830 and servers 840 and 845 may be coupled to a network 850. Client systems 810, 820, and 830 generally represent any type or form of computing device or system, such as computing system 710 in FIG. 7.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include a synchronization module 120 as shown in FIGS. 1 and 7.

As illustrated in FIG. 8, one or more storage devices 860 (1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as Network File System (NFS), Server Message Block (SMB), or Common Internet File System (CIFS).

Servers 840 and 845 may also be connected to a storage area network (SAN) fabric 880. SAN fabric 880 generally represents any type or form of computer network or architecture capable of facilitating communication between multiple storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to computing system 710 of FIG. 7, a communication interface may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the embodiments disclosed herein may also be encoded as a computer program, stored in server 840, run by server 845, and distributed to client systems 810, 820, and 830 over network 850.

In some examples, all or a portion of the computing devices in FIGS. 1, 6, and 8 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a synchronization module 120 in FIG. 1 may transform application writes into corresponding replicated application writes, volume contents, and bit map values for respective regions of bitmaps.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   detecting an imminent overflow condition associated with a replication log, wherein
      the replication log identifies a plurality of write operations to be replicated from a first volume to a second volume;
   synchronizing one or more first regions of the first volume with corresponding one or more first regions of the second volume, based upon a first set of write operations identified in a first subset of the replication log, wherein
      the synchronizing the one or more first regions is performed subsequent to the detecting;
   processing a second subset of the replication log, while the synchronizing is being performed, wherein
      the processing comprises
         identifying one or more second regions of the first volume that were modified by a second set of write operations identified in the second subset of the replication log, and
         for each of the one or more second regions,
            determining whether the each of the one or more second regions matches one of the one or more first regions,
            if the each of the one or more second regions matches one of the one or more first regions, excluding the each of the one or more second regions from a set of second regions to be synchronized, and
            if the each of the one or more second regions does not match any of the one or more first regions, including the each of the one or more second regions in the set of second regions to be synchronized; and
   subsequent to the synchronizing the one or more first regions and the processing, synchronizing the set of second regions of the first volume with a corresponding set of second regions of the second volume.

2. The method of claim 1, further comprising:
   receiving a command to begin synchronization of the replication log, wherein
      the command is received after the imminent overflow condition is detected, and
      the synchronizing the one or more first regions of the first volume with the corresponding one or more first regions of the second volume is performed in response to the receiving.

3. The method of claim 1, wherein the processing further comprises:

storing information identifying one of the second regions in response to determining that the one of the second regions does not match any of the one or more first regions.

4. The method of claim 3, wherein the information stored to identify the one of the second regions comprises a generated bit value to indicate a need for synchronizing the one of the second regions of the first volume with a corresponding one of the second regions of the second volume.

5. The method of claim 1, further comprising:
   if one of the second regions does not match any of the one or more first regions, storing information identifying the one of the second regions; and
   if one of the second regions matches one of the one or more first regions, refrain from storing information identifying the one of the second regions.

6. The method of claim 4, further comprising:
   tracking regions of the first volume that have already been synchronized with regions of the second volume.

7. The method of claim 1, wherein the one or more first regions are identified as regions in the first volume that are targeted by the first set of write operations identified in the first subset of the replication log.

8. The method of claim 7, wherein
   the first subset of the replication log and the second subset of the replication log, in combination, comprise the entire contents of the replication log, and
   subsequent to the synchronizing the set of second regions of the first volume with the corresponding set of second regions of the second volume, the replication log is used to maintain write order fidelity between the first volume and the second volume.

9. A computer readable storage medium comprising program instructions executable to:
   detect an imminent overflow condition associated with a replication log, wherein
      the replication log identifies a plurality of write operations to be replicated from a first volume to a second volume;
   synchronize one or more first regions of the first volume with corresponding one or more first regions of the second volume, based upon a first set of write operations identified in a first subset of the replication log, wherein the one or more first regions are synchronized subsequent to the detecting;
   process a second subset of the replication log, while the synchronizing is being performed, wherein
      the program instructions are further executable to
         identify one or more second regions of the first volume that were modified by a second set of write operations identified in the second subset of the replication log, and
         for each of the one or more second regions,
            determine whether the each of the one or more second regions matches one of the one or more first regions,
            exclude the each of the one or more second regions from a set of second regions to be synchronized, if the each of the one or more second regions matches one of the one or more first regions, and
            include the each of the one or more second regions in the set of second regions to be synchronized, if the each of the one or more second regions does not match any of the one or more first regions; and
   synchronize the set of second regions of the first volume with a corresponding set of second regions of the second volume, subsequent to the synchronizing the one or more first regions and the processing.

10. The computer readable storage medium of claim 9, wherein the program instructions are further executable to:
    store information identifying one of the second regions in response to determining that the one of the second regions does not match any of the one or more first regions.

11. The computer readable storage medium of claim 10, wherein the information stored to identify the one of the second regions comprises a generated bit value to indicate a need for synchronizing the one of the second regions of the first volume with a corresponding one of the second regions of the second volume.

12. The computer readable storage medium of claim 9, wherein the program instructions are further executable to:
    if one of the second regions does not match any of the one or more first regions, store information identifying the one of the second regions; and
    if one of the second regions matches one of the one or more first regions, refrain from storing information identifying the one of the second regions.

13. The computer readable storage medium of claim 11, wherein the program instructions are further executable to:
    track regions of the first volume that have already been synchronized with regions of the second volume.

14. The computer readable storage medium of claim 9, wherein the one or more first regions are identified as regions in the first volume that are targeted by the first set of write operations identified in the first subset of the replication log.

15. A system comprising:
    one or more processors; and
    memory coupled to the one or more processors, wherein the memory stores program instructions executable by the one or more processors to:
    detect an imminent overflow condition associated with a replication log, wherein
       the replication log identifies a plurality of write operations to be replicated from a first volume to a second volume,
    synchronize one or more first regions of the first volume with corresponding one or more first regions of the second volume, based upon a first set of write operations identified in a first subset of the replication log, wherein the one or more first regions are synchronized subsequent to the detecting,
    process a second subset of the replication log, while the synchronizing is being performed, wherein
       the program instructions are further executable to
          identify one or more second regions of the first volume that were modified by a second set of write operations identified in the second subset of the replication log, and
          for each of the one or more second regions,
             determine whether the each of the one or more second regions matches one of the one or more first regions,
             exclude the each of the one or more second regions from a set of second regions to be synchronized, if the each of the one or more second regions matches one of the one or more first regions, and
             include the each of the one or more second regions in the set of second regions to be synchronized, if the each of the one or more second regions does not match any of the one or more first regions, and synchronize the set of second regions of the first volume with a corresponding set of second regions of the second volume, subsequent to the synchronizing the one or more first regions and the processing.

16. The system of claim 15, wherein the program instructions are further executable to:

store information identifying one of the second regions in response to determining that the one of the second regions does not match any of the one or more first regions.

17. The system of claim 16, wherein the information stored to identify the one of the second regions comprises a generated bit value to indicate a need for synchronizing the one of the second regions of the first volume with a corresponding one of the second regions of the second volume.

18. The system of claim 15, wherein the program instructions are further executable to:

if one of the second regions does not match any of the one or more first regions, store information identifying the one of the second regions, and if one of the second regions matches one of the one or more first regions, refrain from storing information identifying the one of the second regions.

19. The system of claim 17, wherein the program instructions are further executable to:

track regions of the first volume that have already been synchronized with regions of the second volume.

20. The system of claim 15, wherein the one or more first regions are identified as regions in the first volume that are targeted by the first set of write operations identified in the first subset of the replication log.

* * * * *